United States Patent [19]

Simpson et al.

[11] Patent Number: 5,643,974
[45] Date of Patent: Jul. 1, 1997

[54] COMPOSITE PIGMENTARY MATERIAL

[75] Inventors: Leslie Ainsley Simpson, Normanby; Keith Robson, Whitesmocks; David Trevor Knight, Northallerton; Martin Alec Williamson, Wingate, all of England

[73] Assignee: Tioxide Group Services Limited, United Kingdom

[21] Appl. No.: 596,050

[22] Filed: Feb. 6, 1996

[30] Foreign Application Priority Data

Feb. 16, 1995 [GB] United Kingdom ............... 9502982.3

[51] Int. Cl.$^6$ ............... C09C 1/36; C08K 3/20
[52] U.S. Cl. ............... 523/334; 523/205; 523/220; 524/366; 524/497; 524/567; 106/447
[58] Field of Search ............... 523/205, 220, 523/334; 524/497, 567, 366; 106/436

[56] References Cited

U.S. PATENT DOCUMENTS

| | | | |
|---|---|---|---|
| 4,898,892 | 2/1990 | Melber et al. | 521/54 |
| 4,898,894 | 2/1990 | Melber et al. | 521/54 |
| 4,912,139 | 3/1990 | Melber et al. | 521/57 |
| 5,011,862 | 4/1991 | Melber et al. | 521/54 |
| 5,152,835 | 10/1992 | Nemeh | 106/437 |
| 5,344,487 | 9/1994 | Whalem-Shaw | 106/486 |
| 5,385,960 | 1/1995 | Emmons et al. | 523/205 |
| 5,509,960 | 4/1996 | Simpson et al. | 106/437 |

FOREIGN PATENT DOCUMENTS

| | | |
|---|---|---|
| 0 549 163 | 6/1993 | European Pat. Off. . |
| 61-51061 | 3/1986 | Japan . |
| 5-163454 | 6/1993 | Japan . |
| 2 267 503 | 12/1993 | United Kingdom . |
| WO90/01516 | 2/1990 | WIPO . |
| WO91/01798 | 2/1991 | WIPO . |
| WO93/11183 | 6/1993 | WIPO . |
| WO93/12183 | 6/1993 | WIPO . |
| WO93/12184 | 6/1993 | WIPO . |

Primary Examiner—Tae Yoon

[57] ABSTRACT

A process for the production of a structured composite pigmentary material in the form of a dispersion comprises mixing an aqueous dispersion of inorganic pigmentary particles and an aqueous dispersion of polyvinyl chloride (PVC) particles. The inorganic pigment particles carry a positive surface charge and the PVC particles carry a negative surface charge and the particles in the composite are held in association as a result of these charges. The inorganic pigment particles and PVC particles are mixed in the presence of a surfactant system which provides both anionic and steric stabilisation. In one embodiment the surfactant system comprises a nonionic surfactant having an HLB value greater than 12 and at least 2% by weight of an anionic surfactant with respect to the weight of PVC particl In a second embodiment the surfactant system comprises at least 2% by weight (with respect to PVC) of one of more surfactants providing anionic and steric stabilisation and being ethylene oxide condensation products having a polyoxyethylene chain with an average length of at least 8 oxyethylene units. The product is useful in paints and provides improved opacity compared to conventional pigments and improved gloss compared to known structured composite pigments.

24 Claims, No Drawings

COMPOSITE PIGMENTARY MATERIAL

This invention relates to the preparation of a structured composite pigmentary material and in particular to a structured composite material formed from an inorganic pigment and polyvinyl chloride.

It is well known that the dispersion of a pigment within a pigmented system such as a paint film greatly affects the optical efficiency of the pigment. In particular, flocculation of pigment particles reduces the efficiency with which the particles scatter light.

Recently a number of methods have been disclosed for the preparation of structured composite pigmentary materials in which particulate pigments are associated with "spacer" particles in such a way that the pigment is more uniformly distributed in systems containing these composite materials. For example, a composite pigmentary material and a method of preparation are disclosed in UK Patent Application GB 2 267 503.

These structured composite pigmentary materials have been shown to provide improved opacity in coatings in which they are used. Unfortunately, when these composite pigmentary materials have been prepared from inorganic pigments and rigid polymeric beads, it has been found that coating compositions which contain them generally exhibit a lower gloss than expected. This is disadvantageous when formulating gloss or semi-gloss paints.

It is an object of this invention to provide a structured composite pigmentary material which can be used to formulate coating compositions having improved opacity compared to conventional compositions without the reduced gloss associated with some known structured composite materials.

Surprisingly, this objective can be achieved by a process in which a composite is prepared from selected polymeric particles using a surfactant system which provides both anionic and steric stabilisation. In one embodiment the surfactant system comprises at least two surfactants one of which provides anionic stabilisation, the other of which provides steric stabilisation. In a second embodiment the anionic stabilisation and the steric stabilisation are provided by one surfactant.

According to a first embodiment of the invention a process for the production of a structured composite pigmentary material comprises forming a first aqueous dispersion containing a particulate inorganic pigment in which the pigment particles carry a positive surface charge, forming a second aqueous dispersion containing particulate polyvinyl chloride in which the polyvinyl chloride particles carry a negative surface charge and mixing said first aqueous dispersion and said second aqueous dispersion under conditions such that the mixing does not produce a reversal of the sign of the surface charge on one of the particulate materials wherein said mixing takes place in the presence of at least one anionic surfactant and at least one nonionic surfactant, the anionic surfactant being present in an amount greater than 2 per cent by weight with respect to weight of polyvinyl chloride particles and the nonionic surfactant having hydrophile-lipophile balance greater than 12.

According to a second embodiment of the invention a process for the production of a structured composite pigmentary material comprises forming a first aqueous dispersion containing a particulate inorganic pigment in which the pigment particles carry a positive surface charge, forming a second aqueous dispersion containing particulate polyvinyl chloride in which the polyvinyl chloride particles carry a negative surface charge and mixing said first aqueous dispersion and said second aqueous dispersion under conditions such that the mixing does not produce a reversal of the sign of the surface charge on one of the particulate materials wherein said mixing takes place in the presence of one or more surfactants, said one or more surfactants providing both anionic and steric stabilisation, the one or more surfactants being present in an amount greater than 2 per cent by weight with respect to weight of polyvinyl chloride particles and said one or more surfactants being derivatives of ethylene oxide condensation products having a polyoxyethylene chain with an average length of at least eight oxyethylene units.

The process employs a dispersion of a particulate inorganic pigment. Preferred pigments include titanium dioxide pigments, zinc oxide pigments, antimony oxides, barium pigments, calcium pigments, zirconium pigments, chromium pigments, iron pigments, magnesium pigments, lead pigments, zinc sulphide and lithopone. The most preferred pigments are titanium dioxide pigments and the preferred form of titanium dioxide is rutile titanium dioxide.

The size of the particulate inorganic pigment is chosen to optimise its pigmentary properties and depends upon the chemical composition of the pigment. However, the average primary particle size or average crystal size is usually between 0.05 and 0.5 micrometer. When rutile titanium dioxide is used the average crystal size is preferably in the range 0.2 to 0.3 micrometer and when anatase titanium dioxide is used the average crystal size is preferably in the range 0.1 to 0.35 micrometer.

The inorganic pigment may be an untreated pigment such as the material discharged from an oxidation reactor in the "chloride" process for preparing titanium dioxide. Normally, however, the inorganic pigment is treated before forming the dispersion using conventional pigment treatment processes. For example, titanium dioxide pigments are usually coated with inorganic oxides such as silica, alumina or zirconia and/or phosphates. They may also be treated with organic compounds such as polyhydric alcohols, alkanolamines or siloxanes.

Dispersions of polyvinyl chloride (PVC) particles are readily available commercially, and, generally, such dispersions are suitable for use in the process of the invention.

The average size of the PVC particles can vary over quite wide limits. Usually there is an average size for the particles at which optimum pigmentary properties are demonstrated by the composite which is the product of the process of the invention. This optimum average size for the PVC particles depends upon the nature of the pigment particles but is usually in the range 0.02 to 0.5 micrometer. When the inorganic pigment is rutile titanium dioxide having an average crystal size in the range 0.2 to 0.3 micrometer, the preferred average size of the PVC particles is in the range 0.04 to 0.3 micrometer. More preferably the average size of the PVC particles is in the range 0.05 to 0.15 micrometer.

It is believed that the enhanced opacity of the product of the process of the invention results from the structure of the product in which the particles of polyvinyl chloride act as spacers to reduce flocculation of pigment particles. It is therefore necessary to use proportions of pigment particles and polyvinyl chloride particles which generate this spacing effect. The preferred proportions depend upon the nature of the pigment and the average sizes of the particles used but generally a ratio of PVC particles to pigment particles in the range 0.3:1 to 3.0:1 by volume is used. In the preferred process using rutile titanium dioxide having an average crystal size in the range 0.2 to 0.3 micrometer, the preferred ratio of PVC:$TiO_2$ is from 0.5:1 to 1.7:1 by volume.

The process of the invention can be carried out over a wide range of concentrations but, usually, it is preferred to use the product of the process in a coating composition without further treatment, such as adjustment of the concentration, after the composite is prepared. Consequently, the process usually uses dispersions of inorganic pigment and PVC which each contain at least 20 per cent solids by weight. Preferably, each dispersion contains at least 30 per cent solids by weight and more preferably each contains at least 40 per cent solids by weight.

In the process of the invention the two dispersions are mixed in the presence of a surfactant system which provides both anionic stabilisation and steric stabilisation. In the first embodiment the system comprises at least one anionic surfactant and at least one nonionic surfactant. In this system, preferred anionic surfactants include alkyl sulphates, alkyl sulphonates, alkyl phosphate esters and salts, dialkyl sulphosuccinates, alkylaryl sulphonates and alkylaryl sulphonic acids. Surfactants which are particularly useful are salts of long chain-substituted benzene sulphonic acid such as sodium dodecyl benzene sulphonate or sodium tridecyl benzene sulphonate.

In the second embodiment of the invention the system comprises at least one surfactant which provides anionic and steric stabilisation from the same molecule. Surfactants useful in this second embodiment include alkyl polyethylene oxide phosphates and sulphated alkyl phenol ethoxylates.

The anionic surfactant or the surfactant providing anionic and steric stabilisation is present in the mixture formed from the two dispersions in an amount greater than 2 per cent by weight calculated with respect to the weight of PVC present. Normally, the amount used is less than 12 per cent by weight calculated with respect to weight of PVC and preferably between 3 and 10 per cent by weight is present.

Usually, the anionic surfactant or the surfactant providing anionic and steric stabilisation is used to stabilise the PVC dispersion and is therefore present in that dispersion before mixing with the dispersion of inorganic pigment.

In the first embodiment of the invention at least one nonionic surfactant is present. This nonionic surfactant can be chosen from a number of types of surfactants such as sugar esters of fatty acids, polyethoxylated esters of fatty acids and polyethoxylated ethers of fatty alcohols or alkyl substituted phenols. Particularly useful nonionic surfactants are the polyethoxylated derivatives of phenol such as polyethoxy nonyl phenol and polyethoxy octyl phenol.

In the first embodiment the nonionic surfactant has a hydrophile-lipophile balance (HLB) greater than 12. Preferably, the HLB is at least 13 and, more preferably, at least 14. The HLB for a particular surfactant can generally be obtained by reference to textbooks or manufacturer's literature but there exist methods for estimating HLB and the parameter can also be determined empirically. Polyethoxylated alkyl phenols, which are useful surfactants for this invention show increasing HLB values as the average number of oxyethylene units in the molecule increases. A polyethoxylated octyl or nonyl phenol having 8 oxyethylene units has been shown to have an HLB of approximately 12, a similar compound containing 10 oxyethylene units has an HLB of approximately 13 and a similar compound containing 12 oxyethylene units has an HLB of approximately 14.

A preferred method of carrying out the first embodiment of the current invention comprises using a nonionic surfactant which is a polyethoxylated alkyl phenol having at least 8 oxyethylene units in the polyethylene oxide chain. More preferably at least 10 oxyethylene units groups are present and most preferably at least 12 oxyethylene units are present.

According to the second embodiment of the invention a surfactant which is a derivative of an ethylene oxide condensation product is used. The polyoxyethylene chain in this derivative contains at least 8 oxyethylene units, more preferably at least 10 oxyethylene units and most preferably at least 12 oxyethylene units.

It is essential that the two dispersions are mixed in the presence of the surfactant system as claimed. Frequently, as stated hereinbefore, the PVC dispersion is prepared in the presence of at least one surfactant of the system. However, in processes wherein more than one surfactant is used one or more of the surfactants may be added to the dispersion of inorganic pigment or be separately added during mixing. Alternatively, a portion of the surfactant or surfactants used may be added to one of the dispersions and a further portion may be added to the other dispersion or separately.

Although two different surfactant systems have been described as separate embodiments of the invention, a combination of the two systems is within the scope of the invention.

The aqueous dispersion of inorganic pigment used in the process of the invention is prepared in any suitable manner. Most preferably the inorganic pigment is stirred with water in the absence of a dispersing agent. However, as already stated hereinbefore, it is convenient to add some surfactant to the dispersion of inorganic pigment after the dispersion is formed.

Preferably the dispersion of inorganic pigment is subjected to a milling step to break down any aggregates present and to optimise the degree of dispersion of the particles. The milling can be carried out by, for example, high speed impeller mill, ball mill, sand mill, bead mill, stator-rotor mixer or the use of ultrasound.

The PVC dispersion can also be produced in any suitable manner but such dispersions are conveniently prepared by carrying out an emulsion polymerisation of vinyl chloride. Frequently the polymerisation is carried out in the presence of the anionic surfactants which are useful in the practice of this invention.

The dispersion of inorganic pigment is prepared in such a way that the pigment particles carry a positive surface charge. Conveniently this charge is produced by forming the dispersion at an appropriate pH value. The actual pH value chosen will depend upon the nature of the particulate material and upon the nature of the surface of the particles. For example, a titanium dioxide particle having a coating of alumina will carry a substantial positive charge when dispersed at a pH below about 6 whereas the surface charge on a titanium dioxide particle having a coating containing silica will be substantially positive below a pH of about 2.

The dispersion of PVC particles is produced in a manner which ensures that the particles of PVC carry a negative surface charge. This dispersion may be prepared at any pH, but, preferably, in order to simplify the mixing step of the process, the pH of the dispersion is substantially similar to the pH of the dispersion of inorganic pigment particles. Normally, the two dispersions have pH values which differ by not more than 1 pH unit. More preferably the difference is not more than 0.5 pH unit.

When the pH values of the two dispersions are substantially similar the invention is readily carried out by mixing these two dispersions whilst the mixture is agitated by any suitable means. Adequate mixing of the two dispersions is effected, for example, by stirring, recirculatory mixing, by simultaneous introduction of the dispersions into separate arms of a T-piece or by exposing the mixture to the effect of ultrasonic vibrations. Typically, one of the dispersions is added to the other dispersion slowly, or the two dispersions are simultaneously introduced into a mixing zone which may be agitated.

As already stated earlier, the one or more surfactants can be introduced into the mixing zone together with one of the dispersions or may be separately added as the dispersions are mixed.

It may be convenient to prepare the two dispersions at substantially different pH values. When dispersions having substantially different pH values are used it is important to mix the dispersions under conditions such that the sign of the surface charge on either of the particulate materials is not reversed by any changes in pH which may occur during mixing. For example it may be necessary to add an acid or a base to adjust the pH during the mixing step.

For example, a suitable pH value for producing a composite from alumina-coated titanium dioxide is about 4 to 5. However, commercially available dispersions of PVC may be prepared at a pH of about 7 to 9. A product according to the process of this invention can be formed from titanium dioxide and PVC particles by adding a commercial dispersion of PVC having a pH of 7 to 9 to a dispersion of titanium dioxide at a pH of 4 to 5 whilst the pH of the resultant mixture is maintained in the range of 4 to 5 by the simultaneous addition of an acid.

The product of the process of the invention is a dispersion of a structured composite pigmentary material which can be used to prepare coating compositions such as aqueous emulsion paints. These compositions are frequently formulated at a pH in the range 6 to 10 and more commonly in the range 7 to 9. Frequently, the process of this invention is carried out at a pH below 6, for example in the range 4 to 6. In a preferred process the dispersion of structured composite pigmentary material is prepared at a pH in the range 4 to 6 and is subsequently adjusted to a pH in the range 6 to 10, preferably 7 to 9.

Aqueous emulsion paints are readily formulated according to well known principles using the products of the process of the invention. The structured composite pigmentary material is used in the emulsion paints in place of all or part of the pigments and/or fillers which are normally added. Appropriate steps need to be taken to allow for the water which is added with the structured pigmentary material when this is used as a dispersion. The formulated paints frequently contain other conventional additives such as fillers, antifoam agents, coalescing solvents and thickeners.

The products of the process of the invention have been shown to have a higher opacity than a similar paint containing the same volume fraction in the dried paint film of conventionally added pigment such as titanium dioxide. In addition, the gloss level is generally similar to conventionally formulated paints of a similar composition in comparison to the previously observed reduced gloss obtained when structured composite pigmentary material produced by known means with particles formed from polymers such as polystyrene is used. This enhanced gloss effect enables a paint formulator to produce a paint having good gloss and opacity, or alternatively, allows the formulation of paints with an acceptable gloss or sheen and good opacity but using a higher proportion of fillers in place of relatively expensive components such as titanium dioxide or film-forming emulsion.

The invention is illustrated by the following examples.

EXAMPLE 1

An experimental dispersion of PVC containing 45.0% PVC by weight was used. The mean particle size of the PVC particles was determined by transmission electron microscopy combined with image analysis (Cambridge Instruments Quantimet 570) and was found to be 0.07 micrometer with a geometrical standard deviation of 1.38. The dispersion as prepared contained 4.1% by weight based on PVC weight of sodium dodecyl benzene sulphonate. The pH of the dispersion was adjusted to 4.1 with dilute hydrochloric acid.

A separate dispersion of titanium dioxide pigment (Tioxide TR92) was prepared at a concentration of 51.4% $TiO_2$ by weight by milling a mixture of pigment and water with a stator rotor mixer (Silverson) for 30 minutes. The pH of the dispersion was adjusted to 4.5 with dilute hydrochloric acid. A nonionic surfactant (ICI grade Synperonic NP30), which is a polyethoxylated nonyl phenol having a polyethylene oxide chain containing 30 ethylene oxide groups, was added to the titanium dioxide dispersion as a 20% by weight solution in water at a concentration of 0.49% NP30 by weight based on weight of $TiO_2$ dispersion (equivalent to 4% by weight on the PVC subsequently mixed with the $TiO_2$ dispersion). The median particle size of the dispersed pigment was measured using a Malvern Mastersizer MS20 and found to be 0.30 micrometer which is indicative of good dispersion.

911.5 g of the titanium dioxide dispersion were mixed with 250.0 g of the PVC dispersion described above by simultaneously pouring the dispersions into a 2 liter vessel during 2 minutes. The mixture was continuously agitated with a blade stirrer during formation and for a further 4 minutes after addition was complete. The pH of the resulting dispersion of structured composite pigmentary material was adjusted to 8.6 by the addition of aqueous ammonium hydroxide.

The product (COMPOSITE A) was analysed by measuring weight loss after heating in an oven at 110° C. and subsequently at 600° C. It was found to contain 50.3% composite pigmentary material by weight and this material had a PVC:$TiO_2$ ratio of 0.76:1 by volume.

For comparison a structured composite pigmentary dispersion (COMPOSITE B) was prepared according to the teachings of UK Patent Application GB 2 267 503A. This comparative product contained 61.2% by weight of a structured composite pigmentary material prepared from titanium dioxide (Tioxide TR92) and polystyrene beads having an average diameter of 0.065 micrometers. The bead:pigment ratio in this composite was 0.69:1 by volume.

The dispersion prepared according to the invention (COMPOSITE A) and the comparative dispersion (COMPOSITE B) were used to produce extender-free fully-bound emulsion paints as shown in TABLE 1 and labelled "Example 1" and "Comparison" respectively. A further control paint was prepared using a similar quantity of titanium dioxide which was added conventionally. The paint characteristics are shown in TABLE 2.

The opacity of the paints was determined at constant spreading rate by drawing down films on a polyester film (Melinex) using wire-bound applicator bars and allowing the paint to dry. Contrast ratio was measured using a Pacific Scientific Colorgard Colorimeter and the 60° gloss was determined with a Labotron gloss meter. Colours were measured with a Pacific Scientific Colorgard Colorimeter on thick paint films produced by drawing down a film on a white card substrate, allowing the film to dry, drawing down a second layer of paint over the first film and allowing the film to dry. The results are given in TABLE 3.

TABLE 1

| Ingredient | Parts by weight | | |
|---|---|---|---|
| | Example | Comparison | Control 1 |
| Water | 16.62 | 25.46 | 35.43 |
| Cellulosic Thickener (Cellosize QP4400) | 0.52 | 0.54 | 0.63 |
| Ammonia (0.880 solution) | 0.81 | 0.83 | 0.98 |
| Ammonium salt of polycarboxylic acid (Dispex A40) | 0.17 | 0.18 | 0.21 |
| Nonionic surfactant (Triton CF10) | 0.04 | 0.04 | 0.05 |
| Coalescing solvent (Texanol) | 1.92 | 1.97 | 2.31 |
| Defoaming agent (Foamaster E75C) | 0.14 | 0.14 | 0.17 |
| Biocide (Acticide BX) | 0.14 | 0.14 | 0.17 |
| Titanium dioxide (TIOXIDE TR92) | — | — | 17.91 |
| COMPOSITE A | 44.67 | — | — |
| COMPOSITE B | — | 34.76 | — |
| Vinyl acetate - VeoVa10 copolymer emulsion (Vinamul 6955) | 34.97 | 35.93 | 42.13 |

TABLE 2

| | Example 1 | Comparison | Control 1 |
|---|---|---|---|
| WET paint: | | | |
| Weight solids | 42.23 | 41.56 | 41.72 |
| Volume solids | 30.00 | 30.00 | 30.00 |
| DRIED paint: | | | |
| $TiO_2$ volume fraction | 18.00 | 18.00 | 18.00 |
| Bead volume fraction | 13.60 | 12.43 | — |

TABLE 3

| | Example 1 | Comparison | Control 1 |
|---|---|---|---|
| Contrast ratio at 20 m²/l | 90.9 | 90.7 | 90.1 |
| Spreading rate at CR = 98 | 7.9 | 8.2 | 7.5 |
| Colour | | | |
| L | 97.8 | 97.9 | 97.6 |
| a | −0.39 | −0.39 | −0.37 |
| b | 1.34 | 1.33 | 1.41 |
| Gloss 60° (%) | 62 | 49 | 65 |

EXAMPLE 2

An experimental dispersion of PVC containing 46.2% PVC by weight was used. The mean particle size was determined by x-ray sedimentation analysis (Brookhaven Disk Centrifuge) and was found to be 0.06 micrometer with a geometrical standard deviation of 1.31. The dispersion as prepared containing 4.2% by weight based on PVC weight of sodium dodecyl benzene sulphonate. The pH of the dispersion was adjusted to pH 4.5 using dilute hydrochloric acid.

A separate dispersion of titanium dioxide pigment (Tioxide TR92) was prepared at a concentration of 51.0% $TiO_2$ by weight by milling a mixture of pigment and water with a stator-rotor mixer (Silverson) for 35 minutes. The pH of the dispersion was adjusted to 4.1 with dilute hydrochloric acid. The median particle size of the dispersed pigment was measured using a Malvern Mastersizer MS20 and found to be 0.30 micrometer which is indicative of good dispersion. The $TiO_2$ dispersion was divided into two approximately equal portions and amounts of a 20% solution of non-ionic surfactant (ICI grade Synperonic NP30) were added. The amount added to one portion was equivalent to 0.25 weight % NP30 based on weight of $TiO_2$ (2.0% by weight on PVC) and the amount added to the other was 0.49 weight % based on weight of $TiO_2$ (4.0% by weight on PVC). After adding the non-ionic surfactant, each portion of pigment slurry was re-milled for 2 minutes.

Composite products were formed by mixing 942.51 g of each titanium dioxide dispersion with 250.0 g of the PVC latex dispersion in an identical manner to that described in Example 1.

The products were analyzed by measuring weight loss after heating in an oven at 110° C. and subsequently at 600° C. The results are shown in Table 4 below.

TABLE 4

| SAMPLE | % NP30 ON PVC | % SOLIDS CONTENT | BEAD:PIGMENT RATIO BY VOL. |
|---|---|---|---|
| COMPOSITE C | 2.0 | 49.7 | 0.73:1 |
| COMPOSITE D | 4.0 | 48.2 | 0.76:1 |

The composite products shown in Table 4 were tested for comparison purposes alongside a structured composite formed from polystyrene beads. This was the same material which was used for comparative purposes in Example 1 (COMPOSITE B).

COMPOSITES B, C and D were used to prepare extender-free fully-bound emulsion paints as shown in Table 5 below. The paint characteristics are shown in Table 6.

The opacity of the paints at constant spreading rate and the 60° gloss values were determined in the manner described in Example 1. The results are shown in Table 7.

TABLE 5

| | Parts by weight | | |
|---|---|---|---|
| Ingredient | Example 2a | Example 2b | Comparison |
| Water | 16.17 | 14.61 | 25.01 |
| Cellulosic Thickener (Cellosize QP4400) | 0.53 | 0.52 | 0.54 |
| Ammonia (0.880 solution) | 0.82 | 0.81 | 0.83 |
| Ammonium salt of polycarboxylic acid (Dispex A40) | 0.18 | 0.17 | 0.18 |
| Nonionic surfactant (Triton CF10) | 0.04 | 0.04 | 0.04 |
| Coalescing solvent (Texanol) | 1.93 | 1.92 | 1.97 |
| Defoaming agent (Foamaster E75C) | 0.14 | 0.14 | 0.14 |
| Biocide (Acticide BX) | 0.14 | 0.14 | 0.14 |
| COMPOSITE C | 44.80 | — | — |
| COMPOSITE D | — | 46.67 | — |
| COMPOSITE B | — | — | 35.24 |
| Vinyl acetate - VeoVa10 copolymer emulsion (Vinamul 6955) | 35.25 | 34.96 | 35.91 |

TABLE 6

| | Example 2a | Example 2b | Comparison |
|---|---|---|---|
| WET paint: | | | |
| Weight solids | 42.18 | 42.25 | 41.61 |
| Volume solids | 30.00 | 30.00 | 30.00 |
| DRIED paint: | | | |
| $TiO_2$ volume fraction | 18.00 | 18.00 | 18.00 |
| Bead volume fraction | 13.09 | 13.64 | 12.46 |

TABLE 7

|  | Example 2a | Example 2b | Comparison |
|---|---|---|---|
| Contrast ratio @ 20 m²/l | 90.5 | 90.5 | 90.8 |
| Gloss 60° | 61 | 64 | 53 |

EXAMPLE 3

The same experimental dispersion of PVC as employed in Example 2 was used, containing 46.2% PVC by weight. The dispersion as prepared contained 4.2% by weight based on PVC weight of sodium dodecyl benzene sulphonate. The pH of the dispersion was adjusted to pH 4.0 using dilute hydrochloric acid.

A separate dispersion of titanium dioxide pigment (Tioxide TR92) was prepared at a concentration of 51.0% $TiO_2$ by weight by milling a mixture of pigment and water with a stator-rotor mixer (Silverson) for 35 minutes. The pH of the dispersion was adjusted to 4.1 with dilute hydrochloric acid. The median particle size of the dispersed pigment was measured using a Malvern Mastersizer MS20 and found to be 0.30 micrometer which is indicative of good dispersion.

A non-ionic surfactant (ICI grade Synperonic NP30) was added to the titanium dioxide dispersion as a 20% by weight solution in water at a concentration of 0.49% NP30 by weight based on weight of $TiO_2$ dispersion (equivalent to 4% by weight on the PVC subsequently mixed with the $TiO_2$ dispersion). After adding the non-ionic surfactant, the pigment slurry was re-milled for 2 minutes.

A composite product (COMPOSITE E) was formed by mixing 942.51 g of titanium dioxide dispersion with 250.0 g of the PVC latex dispersion in an identical manner to that described in Example 1. The product was analyzed by measuring weight loss after heating in an oven at 110° C. and subsequently at 600° C. It was found to contain 50.4% composite pigmentary material by weight and this material had a PVC:$TiO_2$ ratio of 0.73:1 by volume.

COMPOSITE E was used to prepare emulsion paints as shown in Table 8 below. A further control paint (Control 2) was prepared using a similar quantity of titanium dioxide which was added conventionally. The paint characteristics and opacity results are given in Table 9.

TABLE 8

| | Parts by weight | | |
|---|---|---|---|
| Ingredient | Control 2 | Example 3a | Example 3b |
| Water | 38.77 | 16.66 | 20.73 |
| Cellulosic Thickener (Cellosize QP4400) | 0.50 | 0.43 | 0.45 |
| Ammonia (0.880 solution) | 0.29 | 0.25 | 0.26 |
| Ammonium salt of polycarboxylic acid (Dispex A40) | 0.37 | 0.32 | 0.33 |
| Nonionic surfactant (Triton CF10) | 0.03 | 0.03 | 0.03 |
| Coalescing solvent (Texanol) | 1.37 | 1.19 | 1.24 |
| Defoaming agent (Foamaster E75C) | 0.10 | 0.09 | 0.09 |
| Biocide (Acticide BX) | 0.10 | 0.09 | 0.09 |
| Extender (Snowcal 60) | 7.99 | 5.30 | 7.17 |
| Extender (Polestar 200P) | 5.32 | 3.53 | 4.78 |
| COMPOSITE E | — | 49.93 | 41.80 |
| Titanium dioxide (Tioxide TR92) | 19.72 | — | — |
| Vinyl acetate - VeoVa10 copolymer emulsion (Vinamul 6955) | 25.45 | 22.18 | 23.02 |

TABLE 9

| | Control 2 | Example 3a | Example 3b |
|---|---|---|---|
| WET paint: | | | |
| Weight solids | 47.52 | 46.63 | 46.13 |
| Volume solids | 30.00 | 30.00 | 30.00 |
| DRIED paint: | | | |
| $TiO_2$ volume fraction | 22.00 | 22.00 | 18.26 |
| Extender volume fraction | 22.99 | 14.95 | 20.05 |
| Bead volume fraction | — | 16.09 | 13.36 |
| Total pigment volume fraction | 44.99 | 53.04 | 51.67 |
| Contrast ratio @ 20 m²/l | 89.5 | 90.2 | 88.6 |

We claim:

1. A process for the production of a structured composite pigmentary material comprising forming a first aqueous dispersion containing a particulate inorganic pigment in which the pigment particles carry a positive surface charge forming a second aqueous dispersion of particulate polyvinyl chloride in which the polyvinyl chloride particles carry a negative surface charge and mixing said first aqueous dispersion and said second aqueous dispersion under conditions such that the mixing does not produce a reversal of the sign of the surface charge on one of the particulate materials wherein said mixing takes place in the presence of at least one anionic surfactant and at least one nonionic surfactant, the anionic surfactant being present in an amount greater than 2 per cent by weight with respect to weight of polyvinyl chloride particles and the nonionic surfactant having a hydrophile-lipophile balance greater than 12.

2. A process for the production of a structured composite pigmentary material comprising forming a first aqueous dispersion containing a particulate inorganic pigment in which the pigment particles carry a positive surface charge, forming a second aqueous dispersion of particulate polyvinyl chloride in which the polyvinyl chloride particles carry a negative surface charge and mixing said first aqueous dispersion and said second aqueous dispersion under conditions such that the mixing does not produce a reversal of the sign of the surface charge on one of the particulate materials wherein said mixing takes place in the presence of one or more surfactants, said one or more surfactants providing both anionic and steric stabilisation and being present in an amount greater than 2 per cent by weight with respect to the weight of polyvinyl chloride particles and said one or more surfactants being ethylene oxide condensation products having a polyoxyethylene chain with an average length of at least eight oxyethylene units.

3. A process according to claim 1 in which the inorganic pigment is rutile titanium dioxide.

4. A process according to claim 2 in which the inorganic pigment is rutile titanium dioxide.

5. A process according to claim 3 or 4 in which the titanium dioxide has an average crystal size in the range 0.2 to 0.3 micrometer.

6. A process according to claim 1 or 2 in which the inorganic pigment is anatase titanium dioxide having an average crystal size in the range 0.1 to 0.35 micrometer.

7. A process according to claim 1 or 2 in which the inorganic pigment is a titanium dioxide pigment the particles of which are coated with an inorganic compound selected from the group consisting of silica, alumina, zirconia and phosphates.

8. A process according to claim 3 or 4 in which the polyvinyl chloride particles have an average particle size in the range 0.04 to 0.3 micrometer.

9. A process according to claim 1 or 2 in which the inorganic pigment particles and the polyvinyl chloride particles are present in a ratio of polyvinyl chloride particles to pigment particles in the range 0.3:1 to 3.0:1 by volume.

10. A process according to claim 1 or 2 in which the first aqueous dispersion and second aqueous dispersion each contain at least 20 per cent solids by weight.

11. A process according to claim 1 in which the anionic surfactant is selected from the group consisting of alkyl sulphates, alkyl sulphonates, alkyl phosphate esters, alkyl phosphate salts, dialkyl sulphosuccinates, alkylaryl sulphonates and alkylaryl sulphonic acids.

12. A process according to claim 2 in which said one or more surfactants are selected from the group consisting of alkyl polyethylene oxide phosphates and sulphated alkyl phenol ethoxylates.

13. A process according to claim 1 in which the anionic surfactant is present in an amount up to 12 per cent by weight with respect to weight of polyvinyl chloride.

14. A process according to claim 2 in which said one or more surfactants are present in an amount up to 12 per cent by weight with respect to weight of polyvinyl chloride.

15. A process according to claim 1 in which the nonionic surfactant is selected from the group consisting of polyethoxy nonyl phenols and polyethoxy octyl phenols.

16. A process according to claim 15 in which the nonionic surfactant contains at least 8 oxyethylene units.

17. A process according to claim 1 or 2 in which the first aqueous dispersion is formed in the absence of a dispersing agent.

18. A process according to claim 1 or 2 in which the inorganic pigment particles are particles of titanium dioxide having a coating of alumina and the titanium dioxide is dispersed at a pH below 6.

19. A process according to claim 1 or 2 in which the inorganic pigment particles are particles of titanium dioxide having a coating containing silica and the titanium dioxide is dispersed at a pH below 2.

20. A process according to claim 1 or 2 in which the first aqueous dispersion and the second aqueous dispersion have pH values which differ by not more than 1 pH unit.

21. A process according to claim 1 or 2 in which the first aqueous dispersion and second aqueous dispersion have pH values which differ substantially and an acid or a base is added during the mixing step.

22. A process according to claim 1 or 2 in which the structured composite pigmentary material is prepared at a pH value below 6 and the pH value of the product dispersion is adjusted to a value in the range 6 to 10.

23. A process according to claim 8 in which the polyvinyl chloride particles have an average particle size in the range of 0.05 to 0.15 micrometer.

24. A process according to claim 5 in which the titanium dioxide particles and the polyvinyl chloride particles are present in a ratio of polyvinyl chloride particles to titanium dioxide particles in the range of 0.5:1 to 1.7:1 by volume.

* * * * *